United States Patent

[11] 3,532,177

[72] Inventor Victor A. Herrman
 503 N. Delaware, Independence, Missouri 64050
[21] Appl. No. 764,067
[22] Filed Oct. 1, 1968
[45] Patented Oct. 6, 1970

[54] HYDRAULIC AUXILIARY DRIVE
 7 Claims, 6 Drawing Figs.
[52] U.S. Cl. ................................................ 180/66
[51] Int. Cl. ...................................... B60k 7/00, B60k 23/08
[50] Field of Search ........................................ 180/66, 446(FM), 10; 244/103—5

[56] References Cited
 UNITED STATES PATENTS
 3,265,147 8/1966 Coordes ................. 180/66(F)X
 3,272,276 9/1966 Budzich ................. 180/66X
 FOREIGN PATENTS
 1,471,943 1/1967 France ..................... 180/66

Primary Examiner—Benjamin Hersh
Assistant Examiner—Milton L. Smith
Attorney—Fishburn, Gold and Litman ABSTRACT: An auxiliary drive apparatus for driving normally non-traction wheels of a vehicle having a chassis mounted on traction wheels and said non-traction wheels. The auxiliary drive apparatus has a hydraulic pump operatively connected to a power source and a hydraulic motor operatively engaging each of said non-traction wheels. The motors are each pivotally mounted adjacent said non-traction wheels and are each moved into driving position by fluid flow from the pump through a forward or reverse drive cylinder to the motor. The motors are normally disengaged from the wheels and only moved into driving engagement when the auxiliary drive is necessary or desired. The fluid flow moves a piston in the respective cylinder against resistance of a spring normally positioning the piston closing a fluid port for flow to or from the motor, to move a piston rod into engagement with an arm extending from the respective motor, thereby moving the motor into driving engagement with the adjacent non-traction wheel.

Patented Oct. 6, 1970

INVENTOR.
VICTOR A. HERRMAN
BY
Fishburn, Gold & Litman
ATTORNEYS

Patented Oct. 6, 1970
3,532,177
Sheet 3 of 3
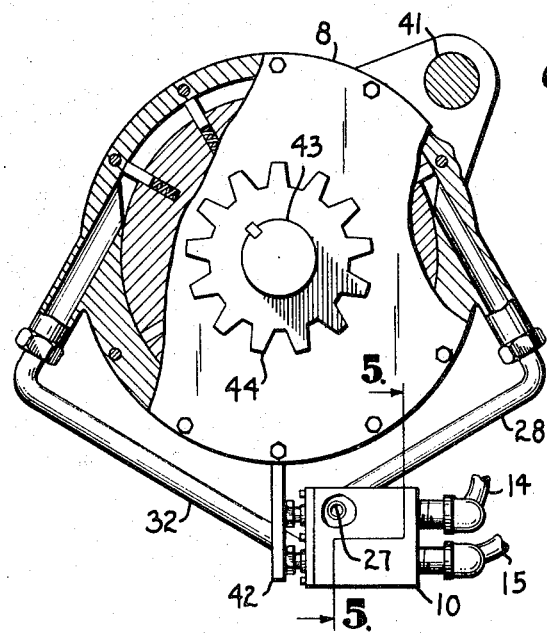
Fig.4.
Fig.5.
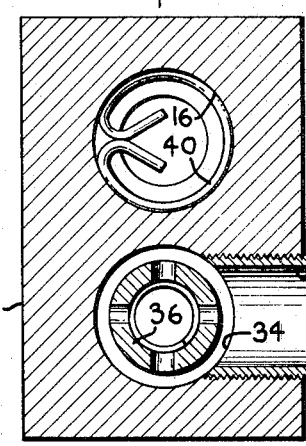
Fig.6.
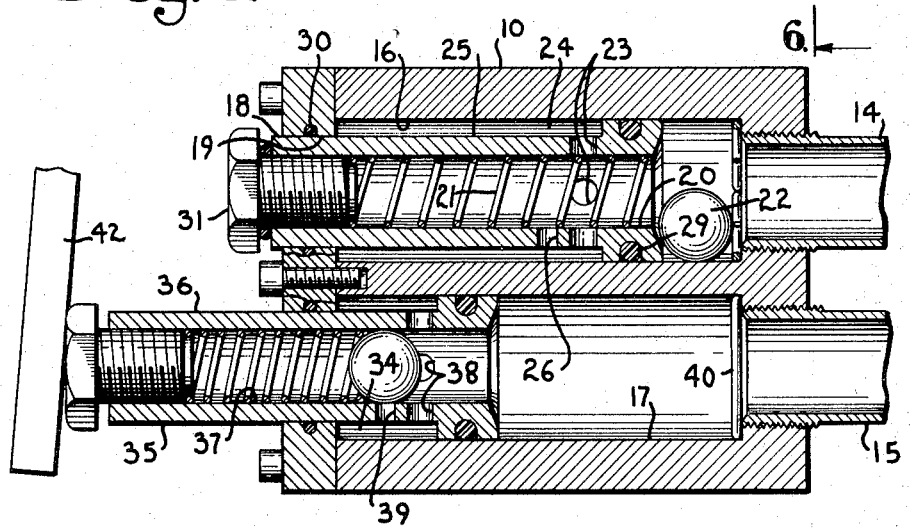
INVENTOR.
VICTOR A. HERRMAN
BY
Fishburn, Gold & Litman
ATTORNEYS

3,532,177

HYDRAULIC AUXILIARY DRIVE

The present invention relates to auxiliary drive apparatus, and more particularly to auxiliary drive apparatus selectively engageable with wheels of a vehicle that are normally non-traction.

On many vehicles an efficient transmission of any of the known types is provided to transmit power from an engine to one or more of the wheels or other ground-engaging elements, leaving one or more idling ground-engaging elements to act merely to support part of the weight of the vehicle and permit vehicle movement. Some vehicles during use often face the difficulty that the driving wheels have not sufficient adhesion to the ground to drive the vehicle. For example, construction equipment is normally driven by the front wheels and passenger vehicles and trucks are normally driven by the rear wheels.

It is often found that the adhesion of the driving or traction wheels is not sufficient and some external assistance is needed to move the vehicle, as, for example, pushing by means of crawler tractors or the like. Another example is an earth transporting vehicle, such as a truck, which must traverse steep gradients. Where only one pair of wheels is driven from an engine, it is often found that on climbing steep gradients there is insufficient wheel adhesion. Further examples include vehicles intended for traveling on occasion over soft ground, ice and snow. If the drive is only to one pair of wheels, then it is often found that where the ground tends to be rather soft, an insufficient propulsive force can be applied to keep the vehicle moving.

The principal objects of the present invention are: to provide an auxiliary drive apparatus for driving normally non-traction wheels of a vehicle; to provide such an auxiliary drive apparatus substantially eliminating the aforesaid difficulties; to provide such an auxiliary drive apparatus operative for forward and reverse drive; to provide such an auxiliary drive apparatus wherein hydraulic motors are mounted in close proximity to the respective non-traction wheels thereby reducing power losses sustained in apparatus having relatively long power trains; to provide such an auxiliary drive apparatus wherein driving engagement with each one of the normally non-traction wheels is accomplished independently, but simultaneously; to provide such an auxiliary drive apparatus wherein free-wheeling of the non-traction wheels is established immediately upon cessation of power application; to provide such an auxiliary drive apparatus which is particularly adapted to use the traction of normally non-traction wheels and thereby increase the propulsive force available to the vehicle, as may be necessary for occasional movement on ice, through mud and snow, on steep gradients, and the like; and to provide such an auxiliary drive apparatus having a minimum of working parts and which is efficient in operation, economical to manufacture, easily maintained, and positive in operation.

Other objects and advantages of this invention will become apparent from the following description taken in connection with the accompanying drawings, wherein are set forth by way of illustration and example certain embodiments of this invention.

FIG. 4 is an enlarged fragmentary elevational view of a drive gear of the hydraulic motor and a forward and reverse drive piston unit for pivotally moving the drive gear into inter-engagement with the ring gear.

FIG. 5 is an enlarged transverse sectional view through the forward and reverse drive piston unit, taken on line 5-5, FIG. 4.

FIG. 6 is an enlarged longitudinal sectional view taken on line 6-6, FIG. 5.

Figure 1:
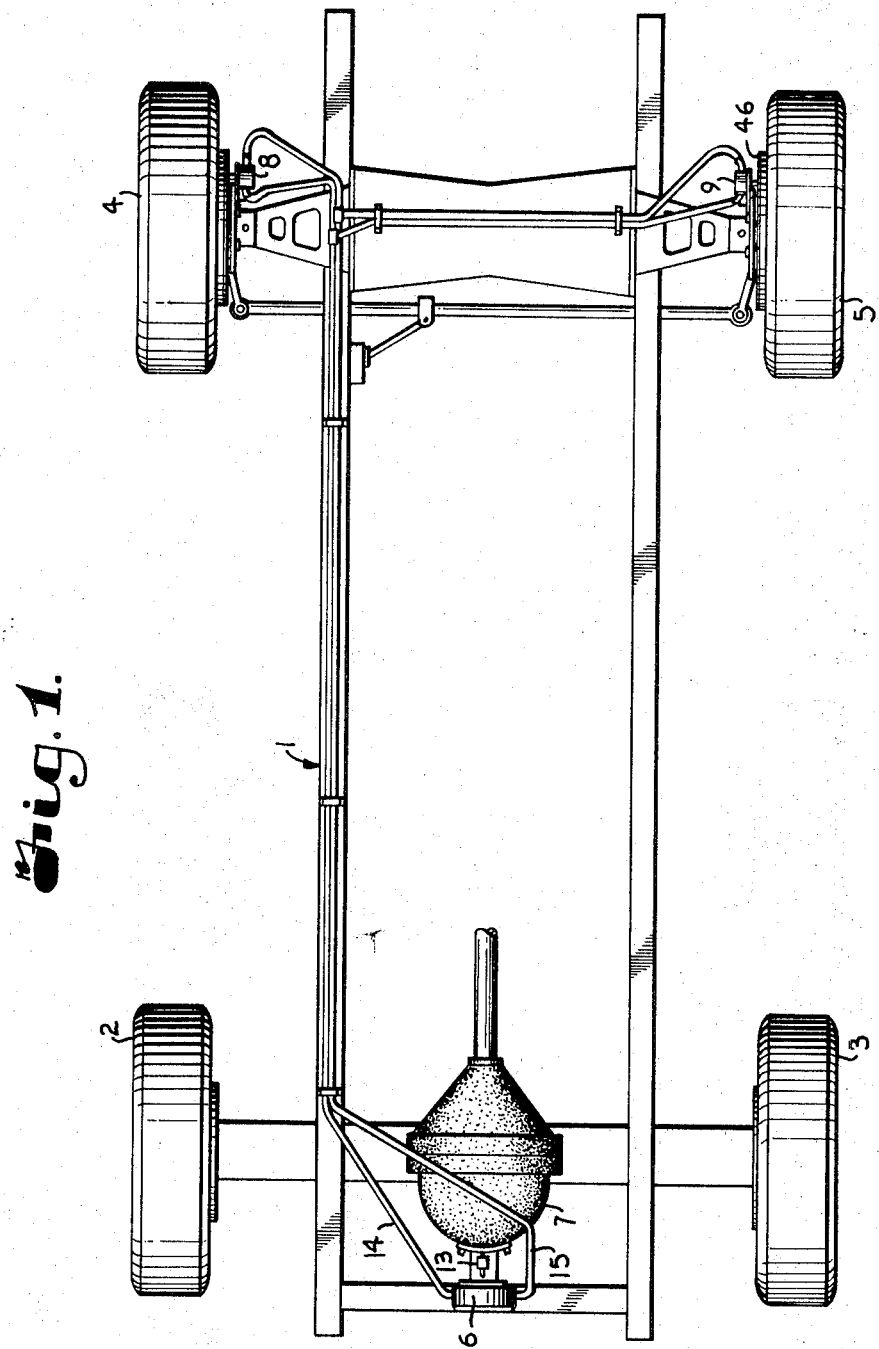
FIG. 1 is a plan view of an auxiliary drive apparatus for driving normally non-traction wheels of a vehicle, with the auxiliary drive apparatus embodying features of the present invention.
Figure 2:
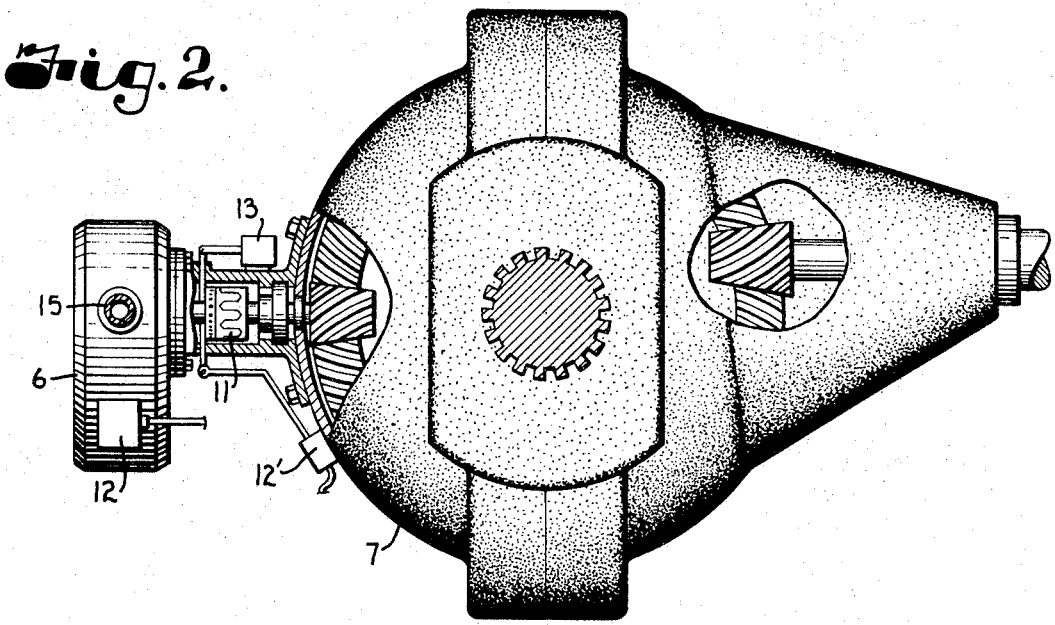
FIG. 2 is an enlarged fragmentary elevational view showing a hydraulic pump operatively connected to a mechanical power source, with portions broken away to better illustrate the component parts.
Figure 3:
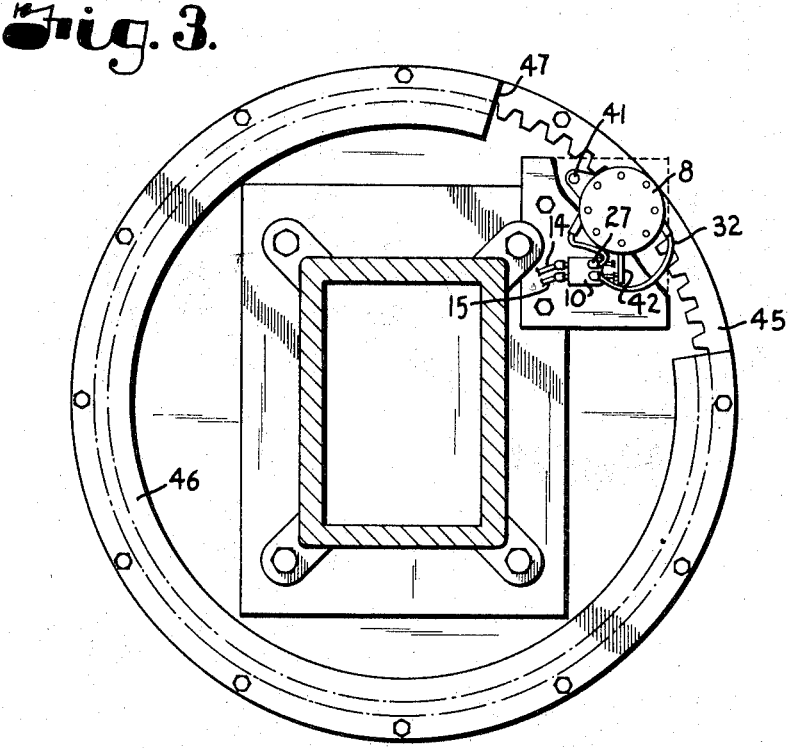
FIG. 3 is an enlarged fragmentary sectional view showing a pivotally mounted hydraulic motor operatively engageable with a ring gear connected to one of the normally non-traction wheels for driving same.

Referring more in detail to the drawings:

The reference numeral 1 generally designates a vehicle having driving or traction wheels 2 and 3 and normally non-traction wheels 4 and 5. A hydraulic pump 6 is operatively connected to a suitable power producing means, such as a transmission or differential 7, and the hydraulic pump 6 is operatively connected to hydraulic motors 8 and 9 adjacent the normally non-traction wheels 4 and 5, respectively. The hydraulic motors 8 and 9 are pivotally mounted and are moved into driving position by fluid flow from the hydraulic pump 6 through a forward and reverse drive piston unit 10.

The hydraulic pump 6 is illustrated as operatively connected to the differential 7, however, the pump 6 could be connected to a transmission (not shown), provided the same speed rates could be developed for the normally non-traction wheels 4 and 5 as for the driving wheels 2 and 3. A clutch 11 is mounted on the hydraulic pump 6 for operatively engaging the hydraulic pump 6 with the differential 7, to thereby provide fluid pressure to the hydraulic motors 8 and 9, as later described. The clutch 11 is remotely operated by a switch 12 which energizes a suitable valve, such as a solenoid valve 13, to engage the clutch 11, whereby the motors 8 and 9 are operatively engaged with the normally non-traction wheels 4 and 5, respectively, and are operative to drive said wheels. The switch 12 may be placed in any convenient position, such as in the cab or on the dashboard (not shown) of the vehicle 1 for operation by an operator or driver (not shown).

It is preferable to have a safety switch 12 on the transmission or differential 7 which is operative to prevent operation of the clutch 11 unless the transmission or differential 7 is in low or reverse gear thereby protecting the operative or moving parts.

The hydraulic pump 6 has suitable fluid flow means extending therefrom, such as flexible hoses 14 and 15 for flow of fluid under pressure to the motors 8 and 9. The flexible hoses 14 and 15 are operatively connected to the forward and reverse drive piston unit 10, which is operative to move the respective hydraulic motor 8 or 9 into driving engagement with the normally non-traction wheel 4 or 5, respectively.

Fluid flows through the forward and reverse drive unit 10 to the motors and from the motors to and through the forward and reverse drive unit 10 for return of fluid to the pump 6. In the illustrated structure, the forward and reverse drive unit 10 has a forward drive cylinder 16 and a reverse drive cylinder 17 which receive fluid under pressure from the flexible hoses 14 and 15, respectively. A forward drive piston 18 is movable within the forward drive cylinder 16. Fluid under pressure enters the forward drive cylinder 16 through the flexible hose 14 and moves the forward drive piston 18 outwardly through a bore 19.

In the illustrated structure, the piston 18 has an elongate internal bore 20 having a suitable elongate resilient member therein, such as a spring 21, having one end supported within the bore 20 and the other end adapted to be engaged by a suitable valving member, such as a spherical ball 22 which is movable within the bore 20. Fluid pressure moves the ball along the bore 20 until the ball 22 moves beyond a plurality of piston outlets 23 circumferentially spaced around the forward drive piston 18, thereby permitting fluid to flow into a chamber 24 formed between an exterior surface 25 of a rod portion of the piston 18 and an interior surface of the forward drive cylinder 16. The piston outlets 23 extend from the bore 20 to the exterior surface 25 and the fluid pressure moves the ball 22 past the outlets 23 to a position closing an opening 26 extending through the rod portion of the piston 18. The opening 26 is spaced from the outlets 23.

Fluid flows from the chamber 24 through a fluid port 27 and suitable flow means, such as an elongate flexible hose 28, extends between the forward drive cylinder 16 and the respective hydraulic motor 8 or 9. In the illustrated structure, suitable seals, such as O-rings 29 and 30, are positioned in the forward drive pistons 18 and in the bore 19, respectively. One end of the rod portion of the piston 18 is internally threaded to receive a suitable adjustment device, such as a bolt 31, adapted to engage one end of the spring 21, to thereby position same within the bore 20.

Fluid under pressure flows from the forward drive cylinder 16 through the fluid port 27 into the flexible hose 28 and through the respective motor 8 or 9, turning same in a direction to produce forward drive. Fluid leaves the motor 8 or 9 through a suitable flow means, such as a flexible hose 32, which has one end connected to a fluid port 33 communicating with a chamber 34 formed between an exterior surface 35 of a rod portion of a reverse drive piston 36 and an interior surface of the reverse drive cylinder 17. Fluid flows from the chamber 34 into an elongate internal bore 37 in the reverse drive piston 36, through a plurality of circumferentially spaced piston outlets 38 and an opening 39 similar to outlets 23 and opening 26 in the forward drive piston 18. Fluid flows from the internal bore 37 past the ball 22 in the reverse drive cylinder 17 and outwardly through the flexible hose 15 for return to the pump 6.

It is necessary to maintain the balls 22 within each of the forward and reverse drive cylinders 16 and 17 therefore, a retainer in the form of a clip 40 is positioned adjacent the connection of the flexible hoses 14 and 15 to the forward and reverse piston units 10, to prevent the balls 22 from moving into the flexible hoses 14 and 15.

The hydraulic motors 8 and 9 are pivotally mounted as at 41 and each have an arm 42 extending therefrom and positioned to be engaged by the rod portions of the forward and reverse drive pistons 18 and 36, which in their extended positions move the motor 8 or 9 into interengagement with the respective normally non-traction wheels 4 and 5. In the illustrated structure, the motors 8 and 9 each have a drive shaft 43 having a drive gear 44 mounted thereon, and positioned to operatively engage a ring gear 45 mounted on each of the non-traction wheels 4 and 5.

It is preferable to protect the ring gears 45 from dirt, mud, debris and the like therefore a shield 46 is mounted adjacent the respective non-traction wheels 4 and 5. The ring gears 45 are movable within the shield 46 and the shield 46 has an opening 47 for entrance of the respective drive gear 44.

In use, the vehicle 1 is stopped and the switch 12 is operated to engage the clutch 11 to operate the hydraulic pump 6. When the differential 7 is in forward drive, the pump 6 moves fluid under pressure through the flexible hose 14 to the forward drive cylinder 16 and the bolt 31 in the forward drive piston 18 is moved into engagement with the arm 42, whereby the drive gear 44 is moved into interengagement with the ring gear 45, for operatively driving the non-traction wheels 4 and 5 in the forward direction. When the differential 7 is in reverse, the fluid flows through the flexible hose 15 to the reverse drive cylinder 17, and the bolt 31 in reverse drive piston 36 is moved into engagement with the arm 42 to pivotally move the drive gear 44 into interengagement with the ring gears 45 to drive the normally non-traction wheels in a reverse direction. In reverse, fluid flows through the flexible hose 14 in returning to the pump 6.

It is to be understood that while I have illustrated and described one form of my invention, it is not to be limited to this specific form or arrangement of parts herein described and shown, except insofar as such limitations are included in the claims.

I claim:

1. An auxiliary drive apparatus for driving normally non-traction wheels of a vehicle having a power producing means driving traction wheels of the vehicle, said drive apparatus comprising:
   a. a hydraulic pump operatively connected to a vehicle power producing means and driven thereby at a certain speed ratio to the traction wheels, said pump having fluid flow means extending therefrom;
   b. a hydraulic motor pivotally mounted adjacent each of normally non-traction wheels of a vehicle, each hydraulic motor having a drive shaft extending therefrom with drive gear means thereon, each hydraulic motor being hydraulically connected to said fluid flow means from said pump;
   c. gear means connected to each of the normally non-traction wheels, said gear means being interengageable with said drive gear means of said respective motor drive shaft;
   d. means for pivotally moving each hydraulic motor and drive gear means into interengagement with said respective gear means whereby said normally non-traction wheels are operative to drive the vehicle;
   e. said hydraulic pump and motor and said gear means and drive gear means being of size ratios that when operating to drive the normally non-traction wheels said wheels turn at the same rate as the traction wheels; and
   f. means permitting operation of said pump and motor only at low vehicle speed.

2. An auxiliary drive apparatus for driving normally non-traction wheels of a vehicle having a power producing means driving traction wheels of the vehicle, said drive apparatus comprising:
   a. a hydraulic pump operatively connected to a vehicle power producing means, said pump having fluid flow means extending therefrom;
   b. a hydraulic motor pivotally mounted adjacent each of normally non-traction wheels of a vehicle, each hydraulic motor having a drive shaft extending therefrom with drive gear means thereon, each hydraulic motor being hydraulically connected to said fluid flow means from said pump;
   c. gear means connected to each of the normally non-traction wheels, said gear means being interengageable with said drive gear means of said respective motor drive shaft;
   d. means for pivotally moving each hydraulic motor and drive gear means into interengagement with said respective gear means whereby said normally non-traction wheels are operative to drive the vehicle;
   e. clutch means for operatively engaging said hydraulic pump with said vehicle power producing means;
   f. means for operating said clutch means whereby said drive gear means on said drive shafts are moved from an idle position to a drive position;
   g. said gear means connected to each of said normally non-traction wheels is a ring gear mounted thereon;
   h. said vehicle power producing means is a differential having gear means therein; and
   i. said hydraulic pump has a driven shaft extending therefrom with gear means thereon, said gear means on said driven shaft being interengageable with said gear means within said differential whereby said normally non-traction and the traction wheels are driven at substantially the same speed.

3. An auxiliary drive apparatus for driving normally non-traction wheels of a vehicle having a power producing means driving traction wheels of the vehicle, said drive apparatus comprising:
   a. a hydraulic pump operatively connected to a vehicle power producing means, said pump having fluid flow means extending therefrom;
   b. a hydraulic motor pivotally mounted adjacent each of normally non-traction wheels of a vehicle, each hydraulic motor having a drive shaft extending therefrom with drive gear means thereon, each hydraulic motor being hydraulically connected to said fluid flow means from said pump;
   c. gear means connected to each of the normally non-traction wheels, said gear means being interengageable with said drive gear means of said respective motor drive shaft;

d. means for pivotally moving each hydraulic motor and drive gear means into interengagement with said respective gear means whereby said normally non-traction wheels are operative to drive the vehicle;

e. said means for pivotally moving said hydraulic motors including an arm mounted on each of said motors and extending therefrom and piston means engageable with said respective arms, said piston means being hydraulically connected to said motor and said pump;

f. an inlet port and an outlet port in said piston means, said inlet port being connected to said fluid flow means;

g. first flow means connecting said outlet port and said hydraulic motor for operatively driving said respective drive shaft and drive gear; and h. second flow means connecting said respective hydraulic motor and said fluid flow means for returning fluid from said respective motor to said pump.

4. The auxiliary drive apparatus as set forth in claim 3 wherein:

a. said piston means is a pair of pistons, one of said pistons being a forward drive piston and the other of said pistons being a reverse drive piston;

b. resilient means for normally closing said outlet ports in said forward and reverse drive pistons whereby fluid under pressure moves a selected piston to open said respective outlet port for fluid flow to said motor; and c. said returning fluid to said pump flows through said reverse drive piston for forward drive and through said forward drive piston for reverse drive.

5. An auxiliary drive apparatus for driving normally non-traction wheels of a vehicle having a chassis mounted on traction wheels and said normally non-traction wheels, said vehicle having a power producing means driving said traction wheels, said drive apparatus comprising:

a. a hydraulic pump operatively connected to a vehicle power producing means and having an inlet and an outlet;

b. a hydraulic motor pivotally mounted adjacent each of normally non-traction wheels of a vehicle, each of said motors having a drive shaft extending therefrom, said drive shafts each having a drive gear thereon;

c. a ring gear mounted on each of said normally non-traction wheels and interengageable with said respective drive gear;

d. hydraulic means for pivotally moving each of said drive gears into interengagement with said respective ring gears;

e. a fluid distribution system for conducting fluid under pressure from said pump to said hydraulic means for pivotally moving said respective drive gears into interengagement with said respective ring gears whereby said normally non-traction wheels are operative to drive the vehicle; and f. said hydraulic means for pivotally moving said drive gears includes:

1. an arm mounted on each of said motors and extending therefrom;

2. a forward drive cylinder and a reverse drive cylinder each having a piston having a rod extending therefrom and engageable with said respective arm; and 3. a fluid chamber within said forward and reverse cylinders, said fluid chambers each communicating with said fluid distribution system, said chambers each having said respective pistons movable therein in response to fluid pressure within said respective chamber.

6. The auxiliary drive apparatus as set forth in claim 5 including:

a. first flow means extending between said motor and said forward drive cylinder;

b. a fluid port communicating said first flow means with said fluid chamber within said forward drive cylinder;

c. second flow means extending between said motor and said reverse drive cylinder; and d. a fluid port communicating said second flow means with said fluid chamber within said reverse drive cylinder.

7. The auxiliary drive apparatus as set forth in claim 6 including:

a. clutch means for operatively engaging said hydraulic pump with said vehicle power producing means;

b. solenoid operated switch means for operating said clutch means;

c. first resilient means for positioning said piston within said forward drive cylinder in a position closing said fluid port therein; and d. second resilient means for positioning said piston within said reverse drive cylinder in a position closing said fluid port therein.